United States Patent
Harada et al.

(10) Patent No.: US 7,216,995 B2
(45) Date of Patent: May 15, 2007

(54) DEPLOYABLE REFLECTOR

(75) Inventors: Satoshi Harada, Kanagawa (JP); Akira Meguro, Kanagawa (JP); Hironori Ishikawa, Kanagawa (JP); Satoru Ozawa, Chiba (JP)

(73) Assignee: Nippon Telegraph and Telephone Corporation, Tokyp (JP)

( * ) Notice: Subject to any disclaimer, the term of this patent is extended or adjusted under 35 U.S.C. 154(b) by 110 days.

(21) Appl. No.: 10/541,524

(22) PCT Filed: Sep. 9, 2004

(86) PCT No.: PCT/JP2004/013488

§ 371 (c)(1),
(2), (4) Date: Jul. 7, 2005

(87) PCT Pub. No.: WO2005/027186

PCT Pub. Date: Mar. 24, 2005

(65) Prior Publication Data

US 2006/0181788 A1    Aug. 17, 2006

(30) Foreign Application Priority Data

Sep. 10, 2003  (JP) .............................. 2003-318847
Sep. 10, 2003  (JP) .............................. 2003-318862

(51) Int. Cl.
*G02B 5/08*  (2006.01)
*H01Q 15/20*  (2006.01)
(52) U.S. Cl. ...................................... 359/871; 343/915
(58) Field of Classification Search ................ 359/871, 359/846; 343/915
See application file for complete search history.

(56) References Cited

U.S. PATENT DOCUMENTS 4,825,225 A * 4/1989 Waters et al. ................ 343/881

(Continued)

FOREIGN PATENT DOCUMENTS

JP    S63-89745    4/1988
JP    05-058396    3/1993

(Continued)

OTHER PUBLICATIONS

Akira Meguro, et al., "A Modular Cable-Mesh Deployable Structure for Large-Scale Satellite Communication Antennas"; The Institute of Electronics Information and Communication Engineers, B-II, vol. 76-B-II, No. 5, May 1993, pp. 476-484 (with English translation).

*Primary Examiner*—Mark A. Robinson
(74) *Attorney, Agent, or Firm*—Harness, Dickey & Pierce, P.L.C.

(57) ABSTRACT

A deployable reflector of the invention includes connection members that bridge plural extendable structures constituting a deployable truss structure and connect portions corresponding to nodes of a buckling mode occurring in the extendable structures when a surface cable system is given tension, with portions corresponding to antinodes thereof. The surface cable system includes an internal surface cable system and a circumferential surface cable system connected to the outer circumference thereof. A cable used for the internal surface cable system is high in stiffness and small in ratio of length variation to tension variation. A cable used for the circumferential surface cable system is lower in stiffness and smaller in ratio of the tension variation to the length variation than that used for the internal surface cable system. Given tension by the deployable truss structure via the circumferential surface cable system, the internal surface cable system forms predetermined surface shape.

10 Claims, 12 Drawing Sheets

U.S. PATENT DOCUMENTS

| | | | | |
|---|---|---|---|---|
| 6,028,570 A | * | 2/2000 | Gilger et al. | 343/915 |
| 6,225,965 B1 | * | 5/2001 | Gilger et al. | 343/915 |
| 6,618,025 B2 | * | 9/2003 | Harless | 343/915 |
| 2003/0201949 A1 | * | 10/2003 | Harless | 343/915 |

FOREIGN PATENT DOCUMENTS

| | | |
|---|---|---|
| JP | 2000-183640 A | 6/2000 |
| JP | 2001-278197 A | 10/2001 |
| JP | 2003-095199 A | 4/2003 |

* cited by examiner

-- PRIOR ART --

-- PRIOR ART --

-- PRIOR ART --

-- PRIOR ART --

-- PRIOR ART --

-- PRIOR ART --

DEPLOYABLE REFLECTOR

CROSS-REFERENCE TO RELATED APPLICATION

This application is based upon and claims the benefit of priority from Japanese Patent Application Nos. 2003-318847 and 2003-318862, both filed on Sep. 10, 2003, the entire contents of which are incorporated herein by reference.

TECHNICAL FIELD

The present invention relates to a deployable reflector that is mounted on an artificial satellite or the like in a folded state and is deployed in space. In particular, the invention relates to a deployable reflector that has a small volume in a folded state and assumes a predetermined shape in a deployed state.

BACKGROUND ART

To transport a deployable antenna mounted on an artificial satellite or the like to space, a rocket such as an Ariane rocket, or H-IIA is used as a transporting unit. However, the payload shroud of a rocket is restricted. Therefore, to transport a large deployable antenna, it is accommodated in a rocket in a small, folded state and is deployed after the rocket reaches space. Among deployable reflectors constituting such a deployable antenna, exemplified is one that is a combination of plural fundamental structures and can form a large deployable antenna depending on the number of fundamental structures.

FIG. 13 shows the configuration of a conventional deployable reflector in which part (a) is a perspective view showing the entire configuration of the deployable reflector and part (b) is an exploded perspective view showing an exemplary fundamental structure of the deployable reflector. As shown in the figure, the fundamental structure of the deployable reflector is composed of an integrated system of cables 100 with metallic meshes, stand-offs 105, and a deployable truss structure 106. Attached to the deployable truss structure 106 via the stand-offs 105, the integrated system of cables 100 with metallic meshes assumes a polyhedron so that the surface of the deployable reflector approximates a parabolic shape. The deployable truss structure 106 is deployable and foldable. The deployable truss structure 106 in a deployed state keeps the stand-offs 105 at predetermined positions, whereby the integrated system of cables 100 is rendered in a tense state and a predetermined parabolic shape is formed.

FIG. 14 is an exploded perspective view showing the details of the integrated system of cables 100. As shown in the figure, the integrated system of cables is decomposed into a surface cable system 101, metallic meshes 102, tie cables 103, and a back cable system 104.

The metallic meshes 102 are attached to the surface cable system 101 and the individual connecting points of the surface cable system 101 are lowered (as viewed in the figure) by the tie cables 103, whereby a predetermined polyhedral shape is formed. To give tension to the tie cables 103, the back cable system 104 is disposed on the opposite side of the tie cables 103 to the surface cable system 101.

To obtain a predetermined surface shape, during manufacturing process, the cable lengths are adjusted while the shape of the surface cable system 101 is measured, whereby a predetermined surface shape is obtained when the stand-offs 105 are located at predetermined positions.

FIG. 15 illustrates a procedure for forming a surface shape with predetermined accuracy in manufacturing process of the conventional deployable reflector. As shown in the figure, to obtain a predetermined surface shape in manufacturing process, work of adjusting the cable lengths of the tie cables 103 while measuring the shape in a state that a reflector surface is stretched by giving tension to the surface cable system 101 and the back cable system 104 so that they are pulled outward is repeated until the surface shape is formed with predetermined accuracy. For example, if part of the surface cable system 101 is deviated upward from the intended parabolic surface when a shape is measured during manufacturing process, that part of the surface cable system 101 is lowered by shortening related tie cables 103, whereby the shape is changed to come closer to the predetermined shape. The shape is determined by the tensile states of the cables, and the tensile states vary when a certain cable is shortened. Therefore, the predetermined shape cannot be obtained merely by a single adjustment. In view of this, work of measuring deviations by a shape measurement and adjusting the lengths of the tie cables 103 for individual connecting points 110 is repeated, whereby the cable sections of the surface cable system 101 are adjusted so as to be located at predetermined positions and the predetermined shape is achieved.

To facilitate adjustments, the tie cables 103 extend in the direction that traverses the surface cable system 101 so that adjustment of each tie cable length causes a large variation at its connecting point in the surface shape. The surface cable system 101 is made of a cable that is low in stiffness and is relatively large in the ratio of the length variation to the tension variation, and the back cable system 104 is made of a cable that is high in stiffness and is small in the ratio of the length variation to the tension variation. As a result, as shown in FIG. 15, when the length of a tie cable 103 is changed, the positions of the surface cable system 101 connected to the tie cable 103 are mainly changed.

FIG. 16 is a perspective view showing the configuration of another conventional deployable reflector. In the figure, an integrated system of cables 201 is made of a cable that is high in stiffness and is small in the ratio of the length variation to the tension variation, and is supported by support cables 202 that are low in stiffness and is relatively large in the ratio of the length variation to the tension variation. The support cables 202 are attached to an inflatable membrane 203, and the integrated system of cables 201 is rendered tense in a state that the inflatable membrane 203 is expanded by, for example, injunction of air.

FIG. 17 is a perspective view showing the configuration of a further conventional deployable reflector. FIG. 18 is an exploded perspective view showing individual components of this conventional deployable reflector. As shown in the figures, the deployable reflector is composed of an integrated system of cables 100 that functions as an antenna reflection surface and a deployable truss structure 106 as a frame structure. The integrated system of cables 100 is composed of a surface cable system 101, metallic meshes 102, tie cables 103, and a back cable system 104, and is supported by the deployable truss structure 106 via plural stand-offs 105.

The deployable truss structure 106 is composed of eight planar linkages 107 each of which assumes a trapezoidal shape. The planar linkages 107 share a central shaft member 108 and are disposed radially around the central shaft member 108 so as to form the same angles. The deployable truss structure 106 can be folded or deployed by sliding a slide hinge 109 in the axial direction of the central shaft member 108 (disclosed in "A Modular Cable-Mesh Deployable Structure for Large Scale Satellite Communication Antennas", by Akira Meguro, Jin Mitsugi, and Kazuhide Ando, The Institute of Electronics, Information and Communication Engineers B-II Fascicle "Small Special Issue on Next-generation Satellite Communication Technologies," The transactions of the Institute of Electronics, Information and Communication Engineers, B-II, Vol. j76-B-II, No. 5, 1993, pp. 476–484).

For expansion/contraction driving of the planar linkages, annular cables are used that are disposed around the deployable truss structure. Movably connected to tip portions of the respective planar linkages, these cables extend or contract the planar linkages in a synchronized manner by adjusting the cable take-up lengths by rotation of a motor.

Incidentally, the integrated system of cables 100 of the conventional deployable reflectors is made of a pliable, flexible cable and cannot maintain an antenna reflection surface shape on its own. Therefore, the top plane of the deployable truss structure 106 is formed into an approximated spherical shape that approximates a parabolic surface with minimum errors and the integrated system of cables 100 is attached to the deployable truss structure 106 from above via the stand-offs 105, whereby a parabolic surface shape of the integrated system of cables 100 is maintained.

However, with this method, the shape of the integrated system of cables 100 strongly depends on the shape of the deployable truss structure 106. Therefore, for the integrated system of cables 100 to have a highly accurate reflector surface, it is necessary that the deployable truss structure 106 be rigid enough to sustain the tension of the integrated system of cables 100. However, to increase the stiffness of the deployable truss structure 106, it is necessary to make the individual members constituting the deployable truss thicker, which raises a problem of increase in total weight.

Further, in the conventional deployable reflectors, the positions of the stand-offs 105 which supports the integrated system of cables 100 by giving tension thereto vary due to such factors as thermal distortion of the deployable truss structure 106 and repeatability of its deployed shape. As a result, the balance state of the integrated system of cables 100 varies and lengths of the individual cable sections and therefore the shapes vary. The sensitivity to deformation of the support portion is thus high, and hence it is necessary to form the support structure with high accuracy. In particular, since the back cable system is made of a cable that is high in stiffness and is small in the ratio of the length variation to the tension variation from the viewpoint of ease of adjustment, slight variations in the positions of the stand-offs cause large tension variations. The tension variations of the individual cable sections in a balanced state cause length variations of the surface cable system, resulting in a problem that the surface shape of the surface cable system varies greatly.

On the other hand, in the conventional deployable reflector using the inflatable membrane, the inflatable membrane is made of a thin film so as to be deployable and foldable. Therefore, the inflatable membrane is easily deformed by the tension for stretching the reflector surface. Further, it is very difficult to predict behavior of a film-like structure and hence it is difficult to predict positional deviations with respect to a distant antenna feeder. This means a problem that it is difficult to allow the conventional deployable reflector to function as a reflector.

In particular, where a reflector is constructed by using an inflatable membrane, the positions of the reflector surface are not determined correctly in a state that the membrane is expanded. Further, since there is influence of gravity on the ground, it is important to predict a shape analytically taking the zero-gravity state in satellite orbit and other factors into consideration. However, according to the current analysis techniques, it is very difficult to predict a membrane shape with high accuracy. In particular, although the deployable reflector itself needs to be supported in a certain way, a problem remains that when the membrane is supported it is difficult to predict a positional relationship between the support positions and the reflector surface.

An object of the present invention is to realize a deployable reflector that is lighter and larger than conventional ones as well as a deployable reflector in which the deformation sensitivity of a reflector surface to displacements of support positions of a deployable truss structure that supports an integrated system of cables by giving tension thereto can be lowered and bending moment that is generated to give tension to the integrated system of cables and acts on the deployable truss structure can be reduced.

DISCLOSURE OF THE INVENTION

In a deployable reflector according to a first aspect of the invention, a deployable truss structure renders an integrated system of cables in a deployed state by applying tension thereto. It includes a plurality of extendable structures, an extending mechanism, and a connectable structure. The plurality of extendable structures are connected to a plurality of outer circumference fixing points, respectively which are provided in an outer circumferential portion of a surface cable system at predetermined intervals in the circumferential direction of the surface cable system. The extendable structures are configured so as to be extendable in its axial direction. The extending mechanism applies tension to the surface cable system for deployment by extending the plurality of extendable structures and thereby moving the plurality of outer circumference fixing points in the outward direction of the surface cable system. The connectable structure bridges the plurality of extendable structures, and connects portions corresponding to nodes of a buckling mode with portions corresponding to antinodes thereof. The buckling mode occurs in the extendable structures when tension is applied to the surface cable system.

With this configuration, variations of the portions corresponding to buckling-mode antinodes occurring in the extendable structures of the deployable truss structure are restricted because they are connected to the portions corresponding to nodes, and hence buckling itself is prevented from occurring in the extendable structures. The deployable truss structure can thus be prevented from being broken by buckling.

In a deployable reflector according to a second aspect of the invention, a foldable integrated system of cables is rendered in a deployable state when tension by expansion of a deployable truss structure is given, has a surface cable system composed of a cable connecting the apices of a plurality of triangles as connecting points, metallic meshes attached to the surface cable system and serving as an electromagnetic reflective surface, and a back cable system connected to the surface cable system by a plurality of tie cables. The surface cable system has a polyhedral surface structure made up of triangles in a deployed state. The surface cable system includes an internal surface cable system and a circumferential surface cable system that is connected to the outer circumference of the internal surface cable system. A cable used for the internal surface cable system is high in stiffness and small in the ratio of the length variation to the tension variation, and a cable used for the circumferential surface cable system is lower in stiffness and smaller in the ratio of the tension variation to the length variation than a cable used for the internal surface cable system.

If it is rendered in a tense state by the deployable truss structure, the integrated system of cables constituting the reflector surface of the deployable reflector assumes a polyhedral shape that is uniquely determined by the lengths of the three sides of each of the triangles of the internal surface cable system. In this state, suppressing variations in the lengths of the internal surface cable system makes it possible to reduce the degree of deformation of the polyhedral shape that approximates a reflector surface and to thereby reduce the degree of distortion of the reflector surface.

With the configuration of this invention, since the circumferential surface cable system is made of a cable that is low in stiffness and is small in the ratio of the tension variation to the length variation, displacements of the deployable truss structure are absorbed by the circumferential surface cable system and hence tension variations of the reflector surface are reduced. Therefore, the deformation sensitivity to displacements of the deployable truss structure can be lowered. On the other hand, the deployable truss structure need not keep the support positions of the integrated system of cables precisely and is only required to give tension to it. The conditions that its design is required to satisfy can be made less strict than in conventional cases. Further, behavior of the deployable truss structure can easily be predicted analytically, and the accuracy of its positions with respect to an antenna feeder, which is indispensable for determination of performance of a reflector surface, can be predicted. The reliability of design can thus be increased.

A deployable reflector according to a third aspect of the invention combines the configuration in which the connectable structure is added to the deployable truss structure, implemented according to the first aspect of the invention, and the configuration in which the circumferential surface cable system that is more elastic than the internal surface cable system is employed according to the second aspect of the invention.

A fourth aspect of the invention employs cables as the connectable structure in the deployable reflector implemented according to the first aspect of the invention.

A fifth aspect of the invention provides an accommodating unit that accommodates the cables in the deployable reflector implemented according to the fourth aspect of the invention.

In a sixth aspect of the invention, the deployable reflector is implemented according to any one of the first, second and third aspects, and the deployable truss structure is provided between the surface cable system and the back cable system.

In a seventh aspect of the invention, the deployable reflector is implemented according to the first aspect of the invention, a cable is used for the tie cables and the back cable system is lower in stiffness and smaller in the ratio of the tension variation to the length variation than a cable used for the surface cable system.

In an eighth aspect of the invention the deployable reflector is implemented according to the first aspect of the invention, the surface cable system is configured to assume an approximately parabolic surface when deployed.

In a ninth aspect of the invention, the deployable reflector is implemented according to any one of the second and third aspects of the invention, a cable is used for the tie cables and the back cable system is lower in stiffness and smaller in the ratio of the tension variation to the length variation than a cable used for the internal surface cable system.

In a tenth aspect of the invention, the deployable reflector is implemented according to any one of the second and third aspects of the invention and the internal surface cable system is configured so as to assume an approximately parabolic surface when deployed.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

Figure 1:
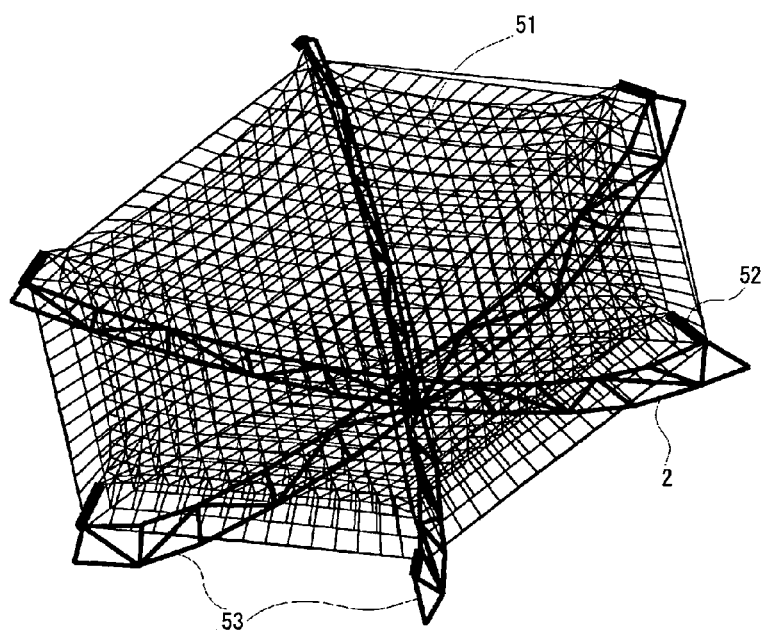
FIG. 1 is a perspective view showing the configuration of a deployable reflector (1) according to the invention.

FIG. 1 is a perspective view showing the configuration of a deployable reflector (1) according to the invention. As shown in the figure, in this deployable reflector, a surface shape is formed in such a manner that an integrated system of cables 51 is stretched on a deployable truss structure 53 via stand-offs 52. For example, where the integrated system of cables 51 having a predetermined shape is used as a reflector of a large deployable antenna to be mounted on a communication satellite, the reflector surface assumes a parabolic shape and radio waves are sent and received by an antenna feeder (not shown) that is installed at the focal point position.

In the deployable truss structure 53, plural (in this example, six) frames 2 (extendable structures) are arranged radially by connecting their proximal portions to each other. The thus-configured deployable truss structure 53 can be folded or deployed with the proximal portions as the rotating point. The deployable truss structure 53 has a small volume in a folded state and assumes a predetermined shape in a deployed state. The stand-offs 52 are attached at the tips of the frames 2 of the deployable truss structure 53, and tip portions of the stand-offs 52 are connected to an outer circumferential portion of the integrated system of cables 51. The deployable truss structure 53 in a deployed state gives tension to a surface cable system that is part of the integrated system of cables 51, and plural triangles of the surface cable system polyhedron-approximates a predetermined curved surface. The curved surface shape of the polyhedrons is determined by the lengths of the sides of the triangles in the tension-applied state.

Figure 2:
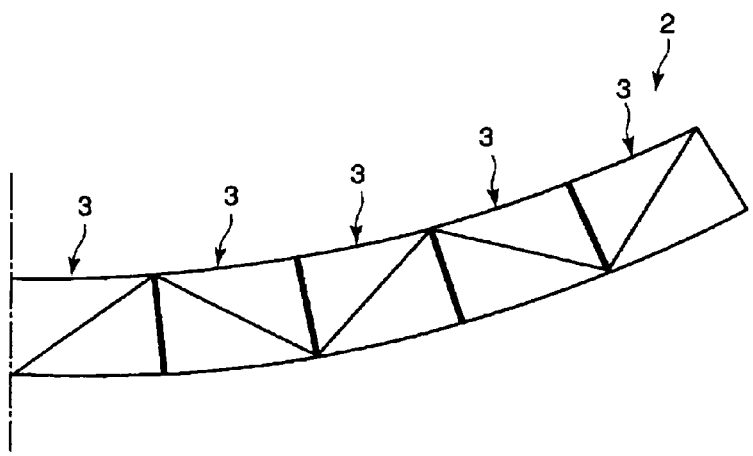
FIG. 2 is a schematic diagram showing the structure of an exemplary frame 2.

FIG. 2 is a schematic diagram showing an exemplary structure of each frame 2. As shown in the figure, the frame 2 is composed of plural (in this example, five) planar links 3. The planar links 3 are arranged adjacent to each other in the axial direction of the frame 2, and adjoining planar links 3 are connected to each other so as to be mirror images of each other, that is, so as to be identical with each other when reversed.

Figure 3:
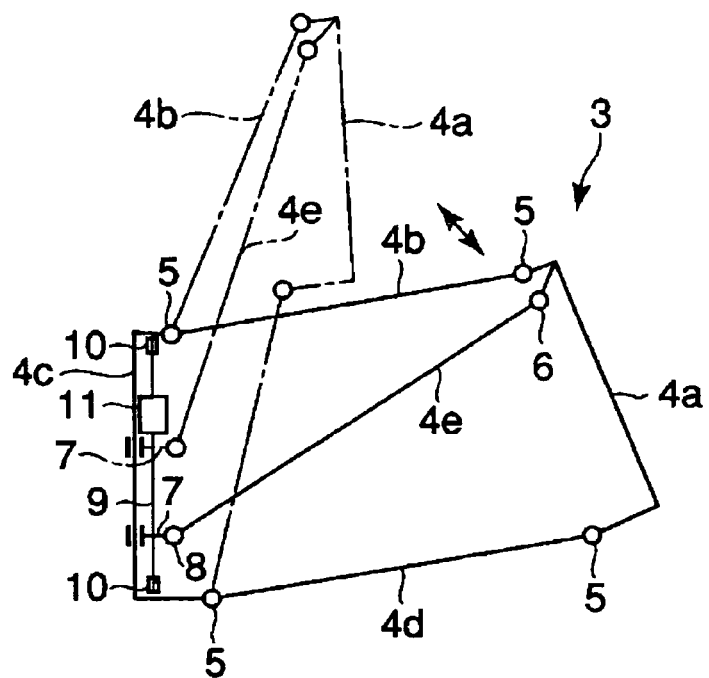
FIG. 3 is a schematic diagram showing the structure of an exemplary planar link 3.

FIG. 3 is a schematic diagram showing an exemplary structure of each planar link 3. As shown in the figure, the planar link 3 has a first link 4a to a fifth link 4e. The first link 4a to the fifth link 4e are straight tubes having the same outer diameter and wall thickness and their lengths are set at respective, predetermined values. Among those links, the first link 4a to the fourth link 4d are connected to each other by revolute hinges 5 and thereby form a rectangular-frame-like chain. The fifth link 4e is provided inside the chain.

One end of the fifth link 4e is rotatably connected to one end portion of the first link 4a via a revolute hinge 6, and the other end of the fifth link 4e is slidably connected, via a slide hinge 7, to the third link 4c that is opposed to the first link 4a. The fifth link 4e is rotatably connected to the slide hinge 7 via a revolute hinge 8.

An annular wire 9 is connected to the slide hinge 7 at its predetermined position. The wire 9 is stretched between small pulleys 10 that are provided at both ends, in its axial direction, of the third link 4c. An intermediate portion of the wire 9 is held by a wire driving device 11 (extending mechanism).

Figure 4:
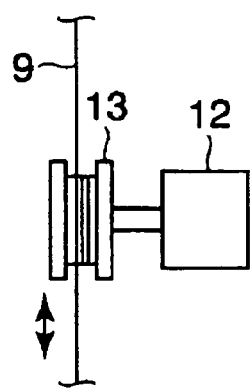
FIG. 4 is a schematic diagram showing the configuration of a wire driving device 11.

FIG. 4 is a schematic diagram showing the configuration of the wire driving device 11. As shown in the figure, the wire driving device 11 has a motor 12 and a large pulley 13 is fixed to its drive shaft. The wire 9 is wound on the large pulley 13, and the wire 9 can be caused to advance or recede in the axial direction of the third link 4c together with the slide hinge 7 by rotating the large pulley 13 by the motor 12.

In the planar link 3 shown in FIG. 3, if the slide hinge 7 is moved in the axial direction of the third link 4c, the fifth link 4e is rotated around the revolute hinge 6 inside the chain which is formed by the first link 4a to the fourth link 4d and moves the first link 4a which is connected to the fifth link 4e in a direction that is inclined from the axial direction of the third link 4c. That is, as indicated by solid lines and chain lines in FIG. 3, the length of the planar link 3 in the axial direction of the frame 2 (i.e., the right-left direction in FIG. 3) is changed. On the other hand, in the frame 2, adjoining planar links 3 are connected to each other in such a manner that they are mirror images of each other. Therefore, the deployable truss structure 53 can be deployed and folded by moving the slide hinges 7 of the respective planar links 3 in manners shown in FIGS. 5 and 6.

Although in the above configuration example the wire driving device 11 for moving the slide hinge 7 is used as a driving unit in expanding the frame 2, the invention is not limited to such a case. For example, each planar link 3 may be allowed to extend by connecting the drive shaft of a motor to all or part of the revolute hinges 5, 6, and 8 which are components of the planar link 3.

Figure 7:
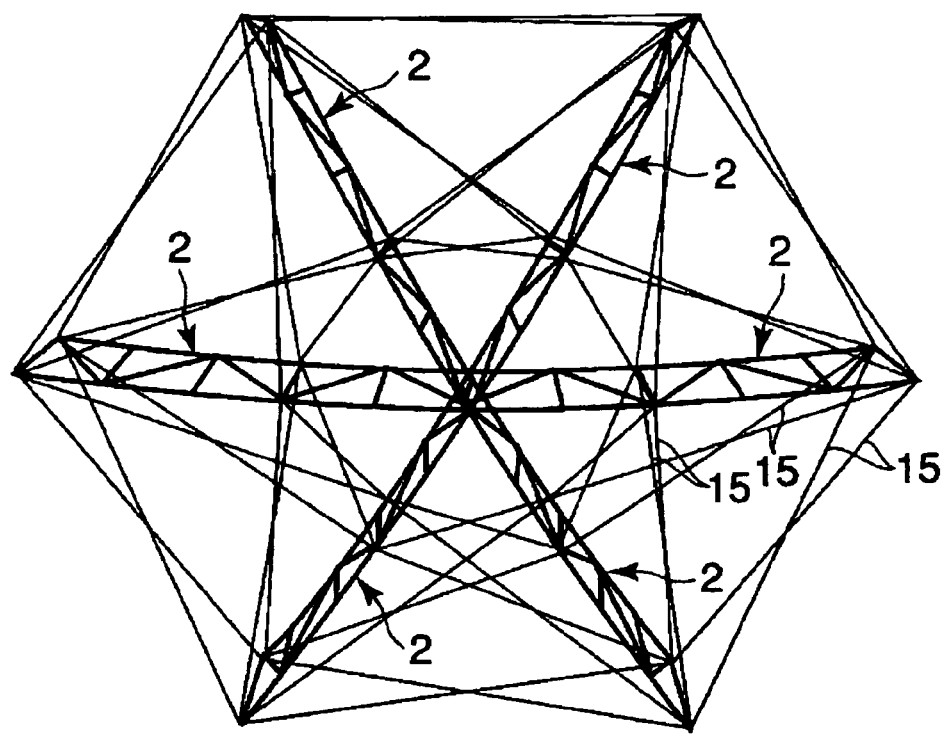
FIG. 7 is a perspective view showing important features of the deployable truss structure 53 of the deployable reflector according to the invention.

FIG. 7 is a perspective view showing important features of the deployable truss structure 53 of the deployable reflector according to the invention. As shown in the figure, plural (in this example, six) cables 15 (connectable structure) bridge adjoining frames 2. Each cable 15 connects portions of the adjoining frames 2 that correspond to nodes of a buckling mode occurring in the frames 2 or portions of the adjoining frames 2 that correspond to a node and an antinode of the buckling mode.

Figure 5:
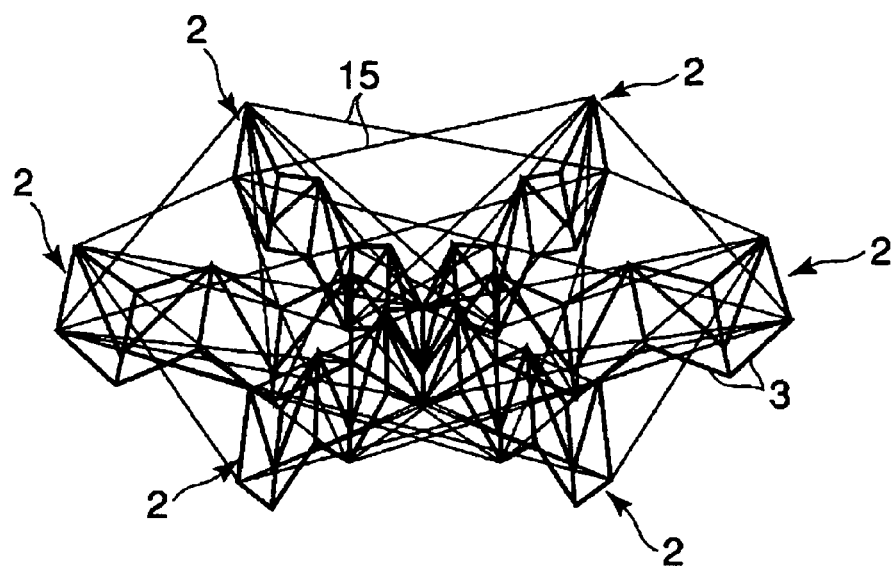
FIG. 5 is a perspective view showing an intermediate state of deployment or folding of a deployable truss structure 53.

In the buckling mode assumed here, the tip portion of each frame 2 becomes a node and an intermediate portion becomes an antinode. Therefore, the tip portions of adjoining frames 2 are connected to each other in crossed form by two cables 15 and each pair of a tip portion and an intermediate portion of adjoining frames 2 are connected to each other in crossed form by two cables 15. FIG. 5 shows the cables 15 in an intermediate state of deployment of the deployable truss structure 53.

Figure 8:
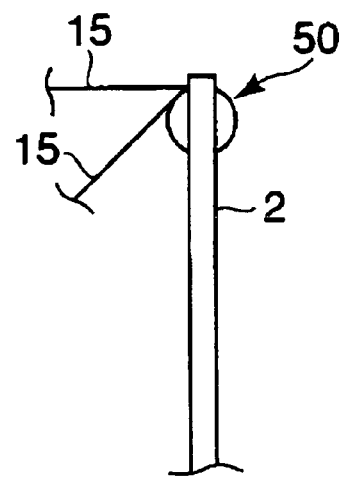
FIG. 8 is a schematic diagram showing the structure of an exemplary accommodating unit for cables 15.
Figure 9:
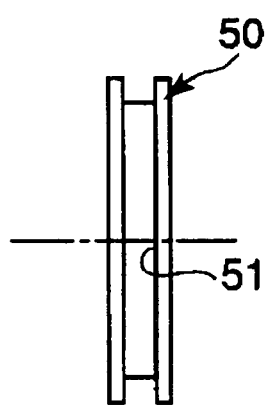
FIG. 9 is another schematic diagram showing the structure of the exemplary accommodating unit for cables 15.

FIGS. 8 and 9 are schematic diagrams showing the structure of an exemplary accommodating unit for cables 15. As shown in the figure, the accommodating unit for cables 15 is a drum 50 that takes up and accommodates cables 15. The drum 50 is attached rotatably to each frame 2, and its outer circumferential surface is formed with a groove 51 in which taken-up portions of the cables 15 are accommodated. With this structure, when the deployable reflector is folded, the cables 15 are taken up and wound on the drums 50, which prevents the cables 15 from being tangled with each other. When the deployable reflector is deployed, the cables 15 are pulled out of the drums 50 as the frames 2 expand.

Figure 10:
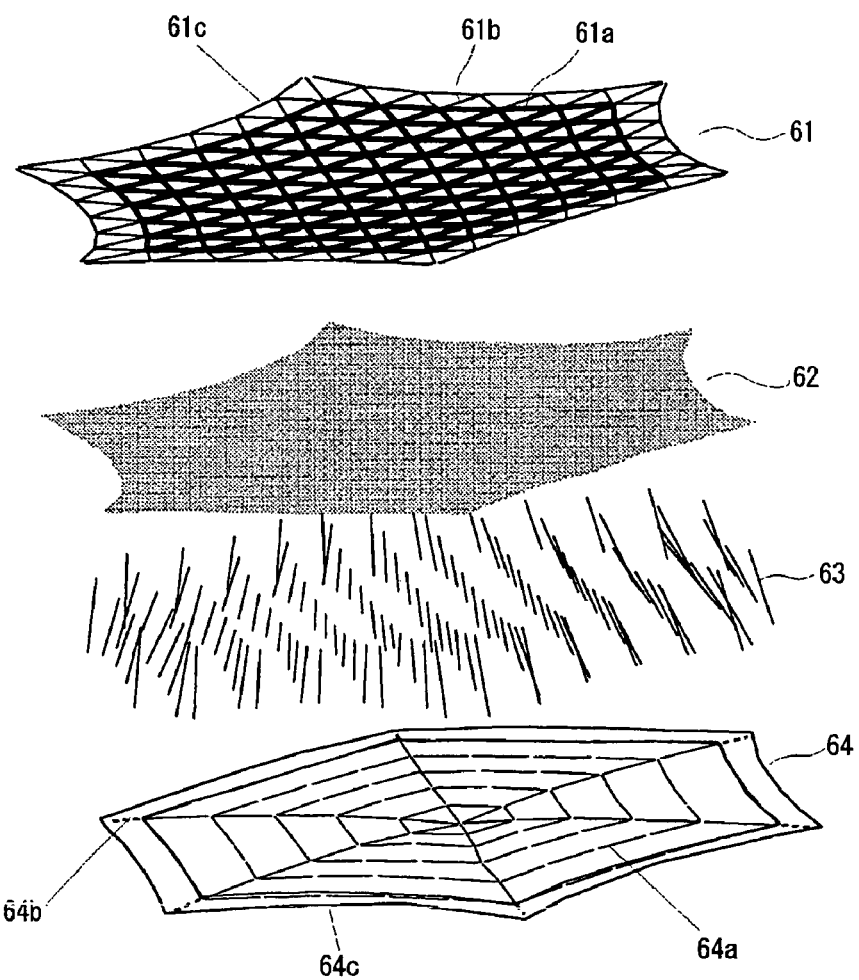
FIG. 10 is an exploded perspective view showing important features of an integrated system of cables 51 of the deployable reflector according to the invention.

FIG. 10 is an exploded perspective view showing important features of the integrated system of cables 51 of the deployable reflector according to the invention. As shown in the figure, the integrated system of cables 51 is decomposed into a surface cable system 61, metallic meshes 62, tie cables 63, and a back cable system 64.

The surface cable system 61 is composed of an internal surface cable system 61a, a circumferential surface cable system 61b, and an outermost, edge surface cable system 61c. The back cable system 64 is composed of an inner back cable system 64a, an outer back cable system 64b, and an outermost, edge back cable system 64c. The surface cable system is an integrated system of cables that is formed by connecting the apices of plural triangles, and assumes, in a deployed state, a polyhedral surface structure made up of the triangles as units of one kind. In this structure, a cable used for the internal surface cable system 61a is high in stiffness and small in the ratio of the length variation to the tension variation (i.e., the cable is hard). One example of the cable that is high in stiffness and is small in the ratio of the length variation to the tension variation (i.e., the cable is hard) is a Kevlar line of about 2 mm in thickness (diameter), that extends by as very small as several millimeters or less (original length: 1 m) when pulled by a force of about 5 kgf.

The internal surface cable system 61a is connected to the edge surface cable system 61c via the circumferential surface cable system 61b. A cable used for the circumferential surface cable system 61b and the edge surface cable system 61c is lower in stiffness and larger in the ratio of the length variation to the tension variation (i.e., the cable is elastic), that is, smaller in the ratio of the tension variation to the length variation, than that used for the internal surface cable system 61a. One example of the cable that is low in stiffness and large in the ratio of the length variation to the tension variation (i.e., the cable is elastic) is one made of a material that is extendable very easily such as rubber or a spring (i.e., the extension length can be varied by a negligible variation in force).

The metallic meshes 62 to serve as an electromagnetic reflective surface are attached to the back surface of the internal surface cable system 61a. Alternatively, the metallic meshes 62 to serve as an electromagnetic reflective surface may be attached to the back surface of the entire surface cable system 61.

The back cable system 64 that is an integrated system of cables is disposed on the back side of the metallic meshes 62. In the back cable system 64, the inner back cable system 64a is connected to the edge back cable system 64c via the outer back cable system 64b. The back cable system 64 is connected to the connecting points of the apices of the plural triangles of the surface cable system 61 via the respective tie cables 63. In this example, all the tie cables 63 for pulling the surface cable system 61 are connected to the back cable system 64 on the side opposite to the surface cable system 61. Alternatively, the surface cable system 61 may be pulled directly from proper points on the deployable truss structure.

In this exemplary configuration, a cable used for the internal surface cable system 61a is high in stiffness. Therefore, the ratio of the length variation to the tension variation is small, and the predetermined shape is formed as long as tension is applied. Therefore, even if the positions of the stand-offs 52 are deviated from the predetermined positions, the metallic meshes 62 that are attached to the internal surface cable system 61a maintain the predetermined shape as long as the deployable truss structure 53 holds up so that tension is given to the internal surface cable system 61a via the circumferential surface cable system 61b and the edge surface cable system 61c.

Further, in this exemplary configuration, a cable being low in stiffness and large in the ratio of the length variation to the tension variation (i.e., the cable is elastic) is used for both of the circumferential surface cable system 61b and the edge surface cable system 61c. Therefore, in a state that the surface cable system 61 is supported by the stand-offs 52, tension variations occurring in the internal surface cable system 61a when the positions of the stand-offs 52 are deviated are smaller than in the conventional surface cable systems. It is very difficult to keep the positions of the stand-offs 52 constant in a deployed state because of such factors as the deployment repeatability and the thermal distortion in orbit. However, this exemplary configuration makes it possible to form a more accurate parabolic reflector surface than in the conventional cases because reflector surface deformation with respect to variations of the support positions is reduced.

A cable used for the tie cables 63 and the back cable system 64 as well as for the circumferential surface cable system 61b and the edge surface cable system 61c, may be lower in stiffness and larger in the ratio of the length variation to the tension variation (i.e., the cable is elastic), that is, smaller in the ratio of the tension variation to the length variation, than that used for the internal surface cable system 61a.

Another possible configuration is such that the hardness is made uniform over the entire surface cable system 61, and that a cable used for the tie cables 62 and the back cable system 64, may be lower in stiffness and larger in the ratio of the length variation to the tension variation (i.e., the cable is elastic), that is, smaller in the ratio of the tension variation to the length variation, than that used for the surface cable system 61.

Incidentally, the structure for preventing, by using the cables 15, buckling of the deployable truss structure 53 for giving tension to the integrated system of cables 51 (see FIG. 7) and the structure for forming the predetermined surface shape by giving tension to the hard internal surface cable system 61a while stabilizing the surface shape by absorbing variations of the stand-off positions by means of the elastic circumferential surface cable system 61b (see FIG. 10) are independent of each other. Therefore, these two factors can be applied to a conventional deployable reflector either separately or in combination.

Figure 11:
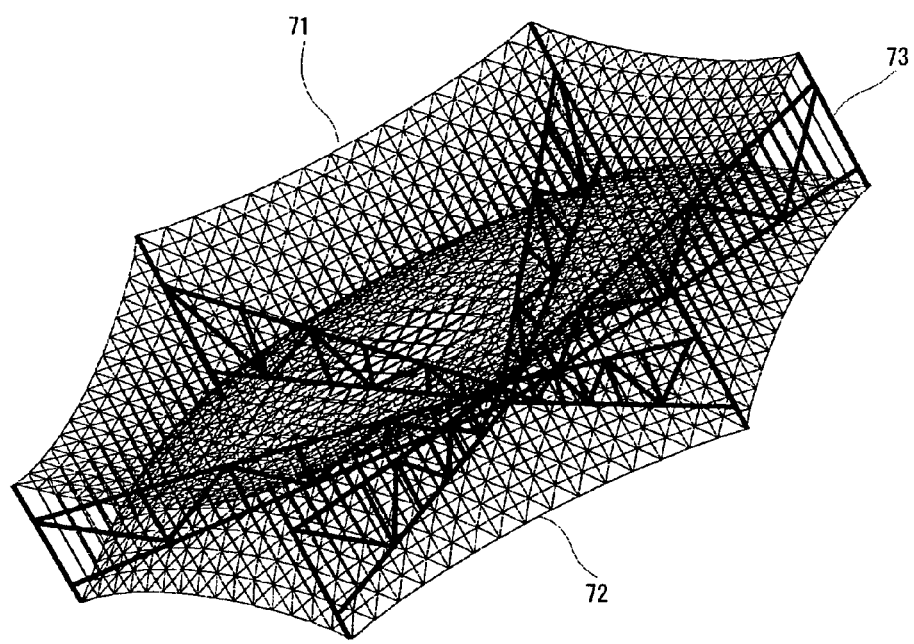
FIG. 11 is a perspective view showing the configuration of a deployable reflector (2) according to the invention.

FIG. 11 is a perspective view showing the configuration of a deployable reflector (2) according to the invention. As shown in the figure, in this deployable reflector, a deployable truss structure 73 is disposed between a surface cable system 71 and a back cable system 72 that constitute an integrated system of cables. The surface cable system 71 and the back cable system 72 are connected to each other via tie cables, and the surface cable system 71 and the back cable system 72 are stretched by applying tension thereto in a state that the deployable truss structure 73 is deployed.

In the exemplary configuration (1), the integrated system of cables (surface cable system, metallic meshes, tie cables, and back cable system) is disposed over the deployable truss structure, and hence the reaction force resulting from the application of tension to the surface cable system acts on the top of the deployable truss structure via the stand-offs. Therefore, not only compressive force that is generated as a result of stretching the surface cable system horizontally and that is directed from the outside to the center act on the deployable truss structure, but also moment acts on the center of the deployable truss structure in such a direction as to bend it upward (see FIG. 1). In contrast, in the exemplary configuration (2) of FIG. 11, in a deployed state, tension is given to each of the surface cable system 71 and the back cable system 72. Therefore, in a deployed state, the moment generated by the reaction force from the surface cable system 71 acts on the center of the deployable truss structure 73 upward in the figure. Conversely, the reaction force from the back cable system 72 acts on the center downward in the figure. Since the two forces cancel out each other, compressive force that is directed from the outside to the center mainly acts on the deployable truss structure 73. In this case, the structure for preventing buckling of the deployable truss structure 53 using the cables 15 (see FIG. 7) is effective.

The surface cable system 71 of the exemplary configuration (2) may be made of an internal surface cable system 61a, a circumferential surface cable system 61b, and an edge surface cable system 61c as shown in FIG. 10. For the circumferential surface cable system 61b and the edge surface cable system 61c, a cable being lower in stiffness and larger in the ratio of the length variation to the tension variation (i.e., the cable is elastic), that is, smaller in the ratio of the tension variation to the length variation, than that used for the internal surface cable system 61a is used. For the back cable system 72 and the tie cables 73, a cable being lower in stiffness and larger in the ratio of the length variation to the tension variation (i.e., the cable is elastic), that is, smaller in the ratio of the tension variation to the length variation, than that used for the internal surface cable system 61a may also be used.

Descriptions will now be made on a form of use of the above-configured deployable reflector and an advantage of the invention.

Figure 6:
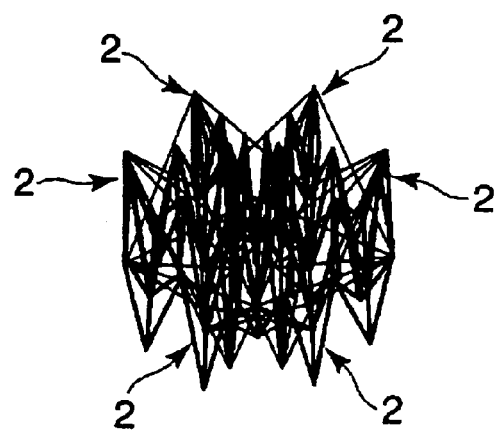
FIG. 6 is a perspective view showing a folded state of the deployable truss structure 53.

To launch a deployable antenna using a deployable reflector according to the invention, as shown in FIG. 6, the deployable truss structure 53 is folded into a small volume and housed in a fairing of a rocket. When the rocket has been launched and a satellite has been separated from the rocket and put in predetermined orbit, to deploy the deployable truss structure 53, the wires 9 are driven by the motors 12 and all the slide hinges 7 are moved to the fourth links 4d along the axial lines of the third links 4c.

As a result, as shown in FIG. 5, each frame 2 is gradually expanded in its axial direction and the stand-offs 52 at the tips of the frames 2 are moved outward in radial directions. When the frames 2 is expanded completely as shown in FIG. 7, the integrated system of cables 51 is deployed into a parabolic surface shape by tension that is given via the deployable truss structure 53. At this time, compressive force that is approximately as strong as the tension applied to the integrated system of cables 51 acts on the tip of each frame 2 in the axial direction. Therefore, when the integrated system of cables 51 is deployed, this compressive force is strong enough to cause buckling of each frame 2.

However, in the deployable reflector according to the invention, as described above, the portions corresponding to buckling-mode nodes occurring in adjoining frames 2 and the portions corresponding to buckling-mode antinodes are connected to each other by cables 15. Therefore, the variations of the portions corresponding to the buckling-mode antinodes are restricted by the cables 15 that are connected to the portions corresponding to the nodes, and hence buckling itself is prevented from occurring in each frame 2. The frames 2 can thus be prevented from being broken by buckling.

To verify the above advantage, the inventors prepared three kinds of deployable truss structures I–III and conducted a buckling experiment. In this buckling experiment, a buckling load of the frames constituting each of the deployable truss structures I–III was examined by connecting an integrated system of cables to each of the deployable truss structures I–III and applying tension to the integrated system of cables. The deployable truss structures I–III are configured as follows.

The deployable truss structure I has the same structure as the deployable truss structure 53 of the deployable reflector according to the invention. The first to fifth links 2a–2e have an outer diameter of about 20 mm, the first to fifth links 4a–4e have a wall thickness of about 0.5 mm, and the deployable truss structure has a total weight of about 27.1 kg.

The deployable truss structure II has the same structure as the deployable truss structure 53 of the deployable reflector according to the invention except that the cables 15 are removed. The first to fifth links 4a–4e have an outer diameter of about 20 mm, the first to fifth links 2a–2e have a wall thickness of about 0.5 mm, and the deployable truss structure has a total weight of about 27.1 kg.

The deployable truss structure III has the same structure as the deployable truss structure 53 of the deployable reflector according to the invention except that the cables 15 are removed. The first to fifth links 4a–4e have an outer diameter of about 25 mm, the first to fifth links 2a–2e have a wall thickness of about 0.5 mm, and the deployable truss structure has a total weight of about 38.5 kg. That is, the outer diameter of the first to fifth links 4a–4e of the deployable truss structure III is larger than that of the deployable truss structure II by about 5 mm.

Figure 12:
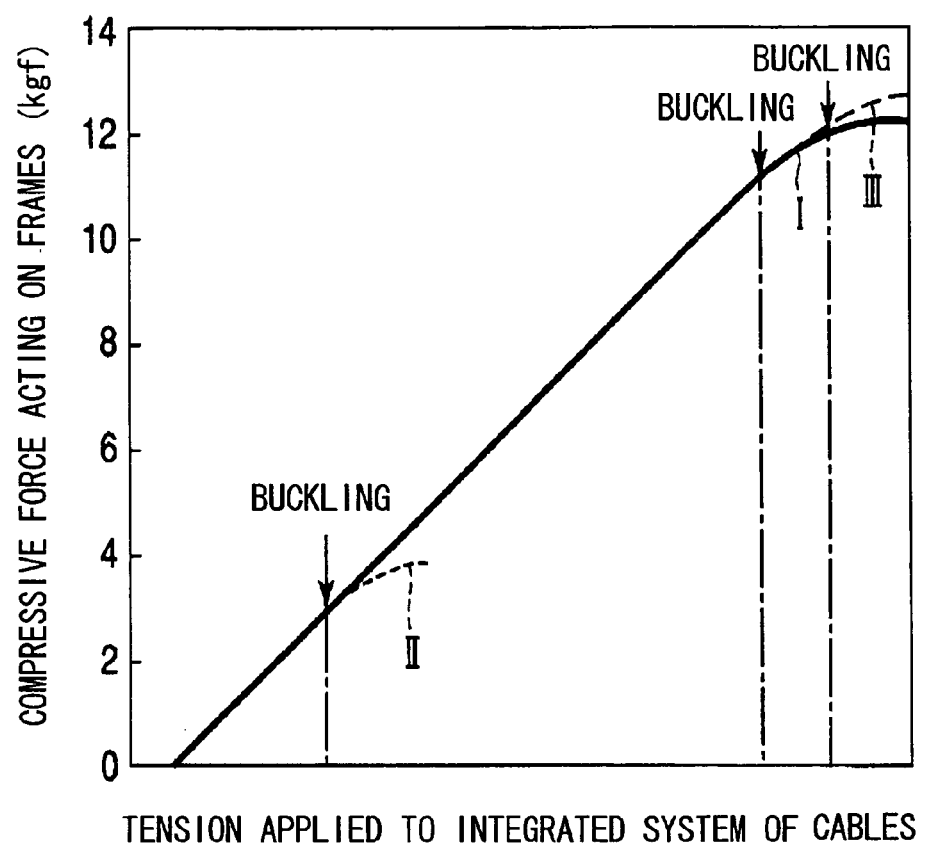
FIG. 12 is a graph showing an experimental result.
Figure 13:
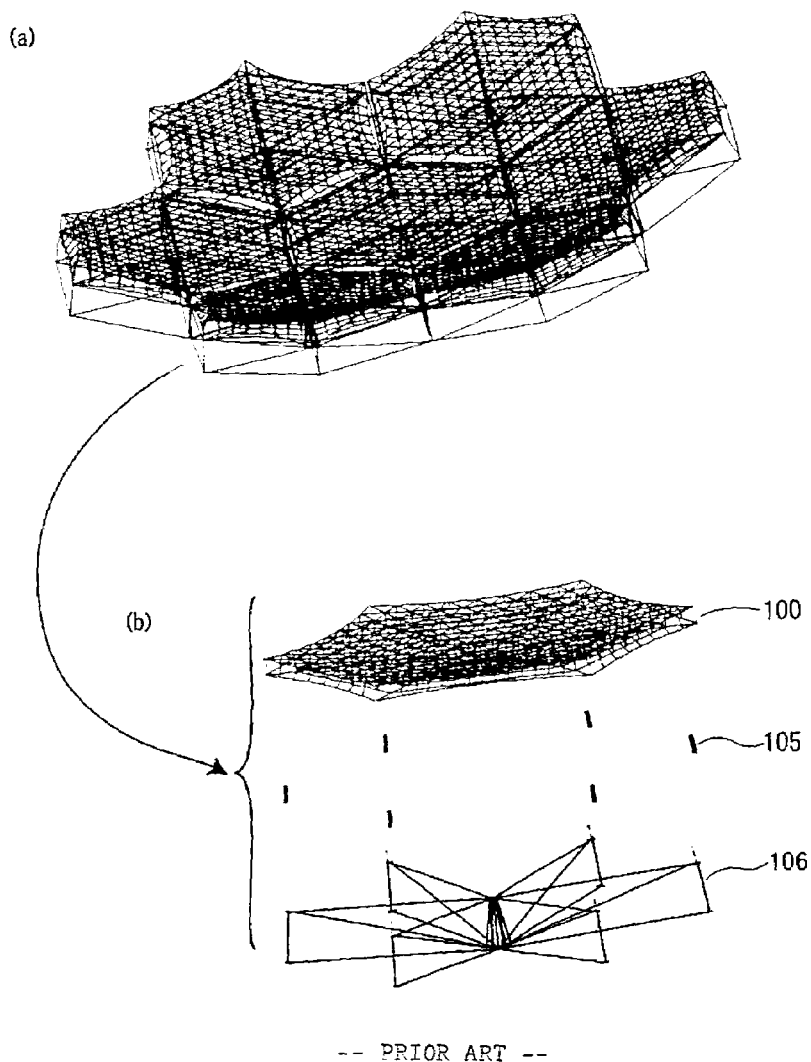
FIG. 13 shows the configuration of a conventional deployable reflector in which part (a) is a perspective view showing the entire configuration of the deployable reflector and part (b) is an exploded perspective view showing an exemplary fundamental structure of the deployable reflector.
Figure 14:
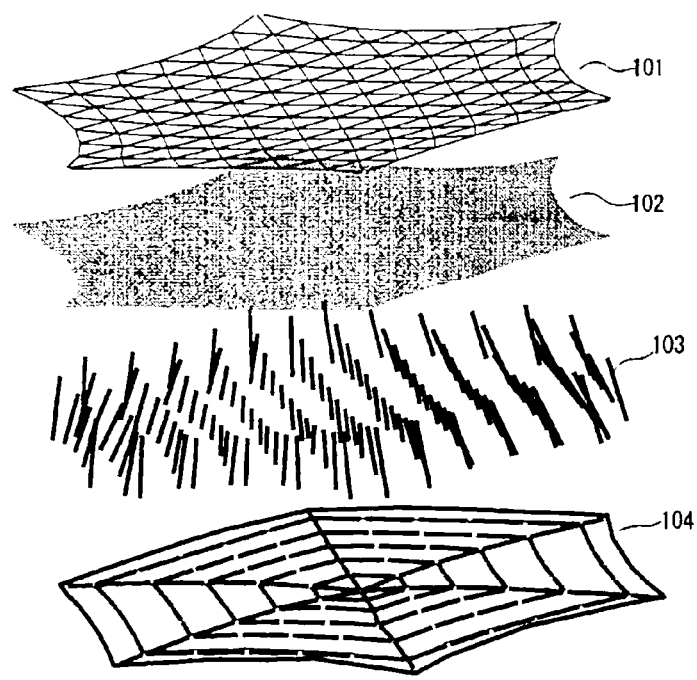
FIG. 14 is an exploded perspective view showing the details of an integrated system of cables 100.
Figure 15:
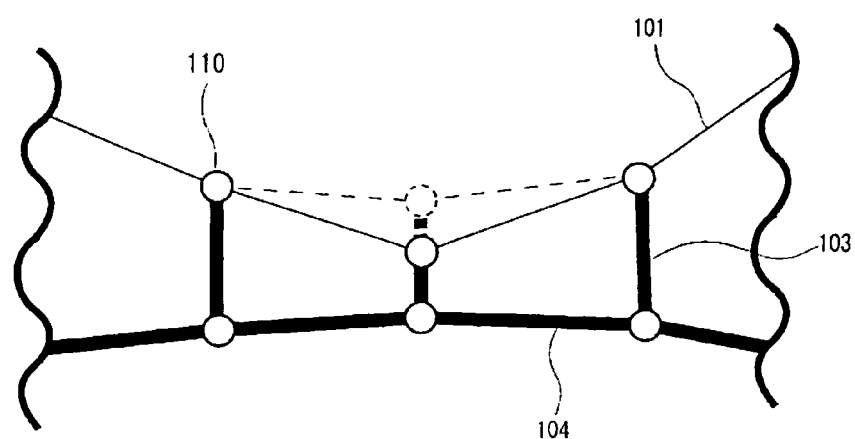
FIG. 15 illustrates a procedure for forming a surface shape with predetermined accuracy in manufacturing process of the conventional deployable reflector.
Figure 16:
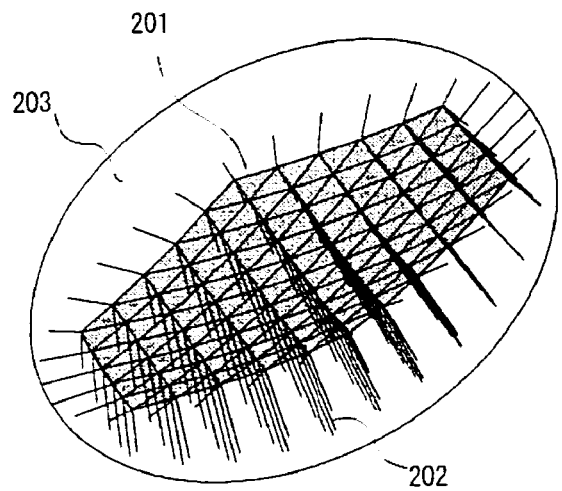
FIG. 16 is a perspective view showing the configuration of another conventional deployable reflector.
Figure 17:
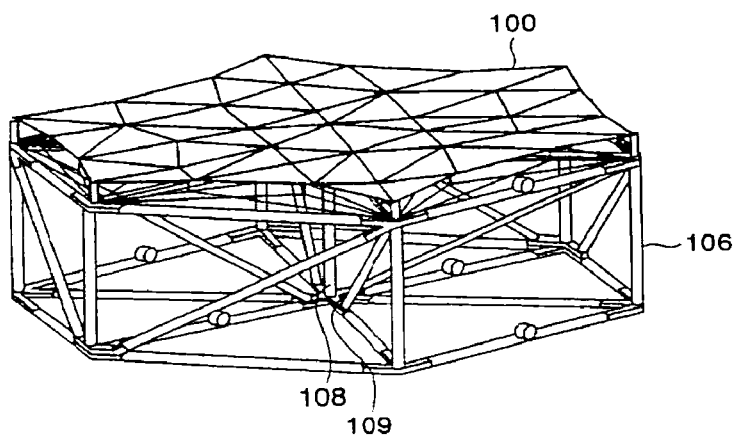
FIG. 17 is a perspective view showing the configuration of a further conventional deployable reflector.
Figure 18:
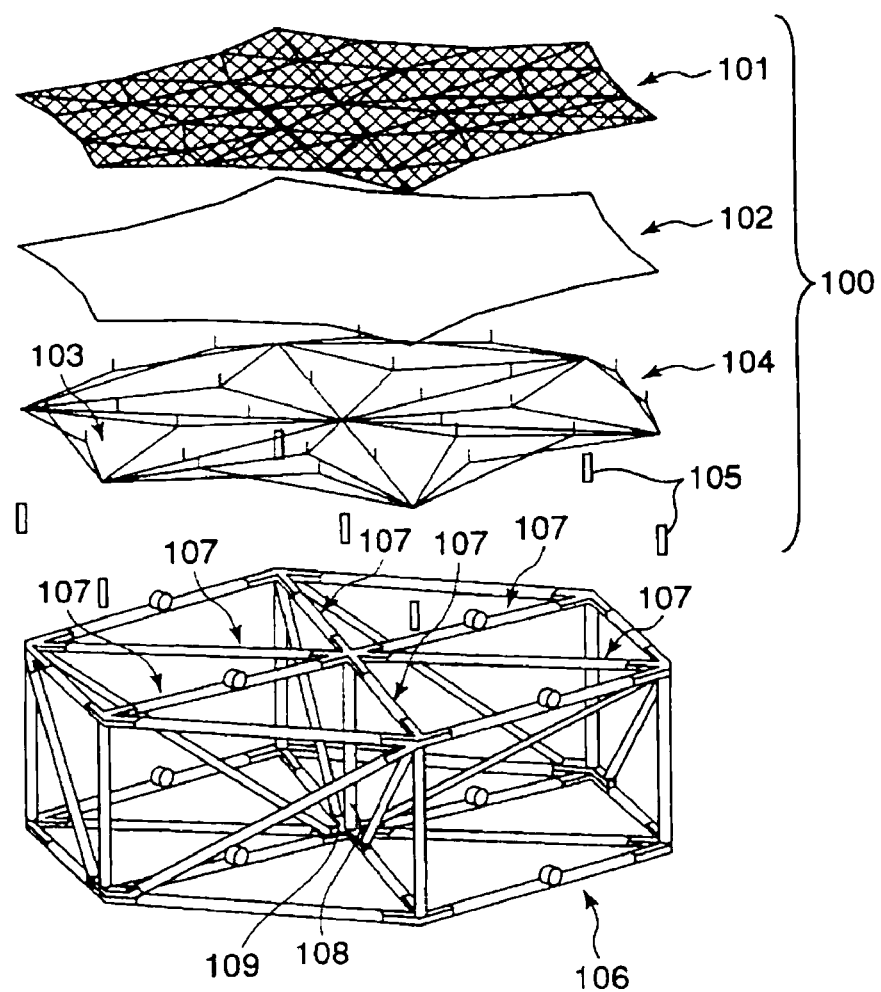
FIG. 18 is an exploded perspective view showing individual components of the conventional deployable reflector.

FIG. 12 is a graph showing an experimental result. In the figure, the horizontal axis of the graph represents the value of the tension applied to the integrated system of cables and the vertical axis represents the value of the compressive force acting on the frames. It has been found that whereas the buckling load of the deployable truss structure II is about 3 kgf, that of the deployable truss structure I according to the invention is 11 kgf. That is, it has become apparent that connecting the portions to serve as buckling-mode nodes and antinodes occurring in the frames by the cable 15 increases the buckling load by as much as about 8 kgf.

On the other hand, the buckling load of the deployable truss structure III is about 12 kgf, which is heavier than that of the deployable truss structure I. However, the deployable truss structure III is heavier by about 11.4 kg because the outer diameter of its links is larger.

This experimental result confirms that connecting the portions to serve as buckling-mode nodes and antinodes occurring in adjoining frames by the cable 15 as in the deployable reflector according to the invention increases the buckling load of the frames 2 greatly without the need for increasing the weight of the deployable truss structure 53.

The invention is not limited to the above embodiments and various modifications may be made without departing from the spirit and scope of the invention. Any improvement may be made in part or all of the components.

INDUSTRIAL APPLICABILITY

The deployable reflector according to the invention is configured in such a manner that the deployable truss structure applies tension to the internal surface cable system constituting the reflector surface via the elastic circumferential surface cable system. Therefore, the deformation sensitivity of the reflector surface to displacements, if any, of the support positions of the deployable truss structure can be lowered, which makes it possible to form a reflector surface that is more accurate than in conventional cases.

Since the support position accuracy that is required, to attain predetermined reflector surface accuracy, for the deployable truss structure for applying tension to the integrated system of cables can be made lower than in conventional cases, the allowable range of deformation of the members constituting the deployable truss structure can be increased. This allows the stiffness of the members to be lowered and thereby makes it possible to construct the deployable truss structure using smaller or thinner members. A lighter deployable reflector can thus be constructed.

Disposing the deployable truss structure between the surface cable system and the back cable system makes it possible to reduce bending moment that acts on the deployable truss structure in giving tension to the integrated system of cables. The loads on the members are decreased, which makes it possible to use lighter members and to design a lighter structure.

Further, by virtue of the structure that variations of the portions corresponding to buckling-mode antinodes occurring in the extendable structures of the deployable truss structure are restricted because they are connected to the portions corresponding to nodes, buckling itself is prevented from occurring in the extendable structures. The deployable truss structure formed by light members can thus be prevented from being broken by buckling.

The invention claimed is:

1. A deployable reflector having:
   an integrated system of cables that is foldable, has a polyhedral surface structure made up of triangles in a deployed state, and includes a surface cable system being composed of a cable connecting apices of a plurality of triangles as connecting points, metallic meshes attached to said surface cable system and serving as an electromagnetic reflective surface, and a back cable system connected to said surface cable system by a plurality of tie cables; and
   a deployable truss structure that renders said integrated system of cables in a deployed state by applying tension thereto, said deployable reflector characterized in that said deployable truss structure comprises:
   a plurality of extendable structures that are connected to a plurality of outer circumference fixing points, respectively, and configured so as to be extendable in an axial direction thereof, said outer circumference fixing points being provided in an outer circumferential portion of said surface cable system at predetermined intervals in a circumferential direction of said surface cable system;
   an extending mechanism that applies tension to said surface cable system for deployment by extending said plurality of extendable structures and thereby moving said plurality of outer circumference fixing points in an outward direction of said surface cable system; and
   a connectable structure that bridges said plurality of extendable structures and connects portions corresponding to nodes of a buckling mode with portions corresponding to antinodes thereof, said buckling mode occurring in said extendable structures when tension is applied to said surface cable system.

2. A deployable reflector having:
   an integrated system of cables that is foldable, has a polyhedral surface structure made up of triangles in a deployed state, and includes a surface cable system being composed of a cable connecting apices of a plurality of triangles as connecting points, metallic meshes attached to said surface cable system and serving as an electromagnetic reflective surface, and a back cable system connected to said surface cable system by a plurality of tie cables; and
   a deployable truss structure that renders said integrated system of cables in a deployed state by applying tension thereto, said deployable reflector characterized in:
   that said surface cable system comprises an internal surface cable system and a circumferential surface cable system that is connected to an outer circumference of said internal surface cable system; and
   that a cable used for said internal surface cable system is high in stiffness and small in a ratio of a length variation to a tension variation, and a cable used for said circumferential surface cable system is lower in stiffness and smaller in a ratio of a tension variation to a length variation than a cable used for said internal surface cable system.

3. The deployable reflector according to claim 1, characterized in:
   that said surface cable system comprises an internal surface cable system and a circumferential surface cable system that is connected to an outer circumference of said internal surface cable system; and
   that a cable used for said internal surface cable system is high in stiffness and small in a ratio of a length variation to a tension variation, and a cable used for said circumferential surface cable system is lower in stiffness and smaller in a ratio of a tension variation to a length variation than a cable used for said internal surface cable system.

4. The deployable reflector according to claim 1, characterized in that said connectable structure is cables.

5. The deployable reflector according to claim 4, characterized by further comprising an accommodating unit that accommodates said cables.

6. The deployable reflector according to any one of claims 1 to 3, characterized in that said deployable truss structure is provided between said surface cable system and said back cable system.

7. The deployable reflector according to claim 1, characterized in that a cable used for said tie cables and said back cable system is lower in stiffness and smaller in a ratio of a tension variation to a length variation than a cable used for said surface cable system.

8. The deployable reflector according to claim 1, characterized in that said surface cable system is configured so as to assume an approximately parabolic surface when deployed.

9. The deployable reflector according to claim 2 or 3, characterized in that a cable used for said tie cables and said back cable system is lower in stiffness and smaller in a ratio of a tension variation to a length variation than a cable used for said internal surface cable system.

10. The deployable reflector according to claim 2 or 3, characterized in that said internal surface cable system is configured so as to assume an approximately parabolic surface when deployed.

* * * * *

UNITED STATES PATENT AND TRADEMARK OFFICE
CERTIFICATE OF CORRECTION

PATENT NO.       : 7,216,995 B2
APPLICATION NO.  : 10/541524
DATED            : May 15, 2007
INVENTOR(S)      : Satoshi Harada et al.

It is certified that error appears in the above-identified patent and that said Letters Patent is hereby corrected as shown below:

TITLE PAGE

(73) should be --Assignee: Nippon Telegraph and Telephone Corporation, Tokyo (JP) --

Signed and Sealed this

Sixteenth Day of October, 2007

JON W. DUDAS
*Director of the United States Patent and Trademark Office*